United States Patent
Hao et al.

(10) Patent No.: US 12,235,897 B1
(45) Date of Patent: Feb. 25, 2025

(54) MULTIMODAL ENHANCEMENT OF INTERACTIONS IN CONVERSATION SERVICE APPLICATIONS

(71) Applicant: FMR LLC, Boston, MA (US)

(72) Inventors: Hua Hao, Dalian (CN); Tieyi Guo, Frisco, TX (US); Byung Chun, Kingston, MA (US); Bing Cui, Dalian (CN); Sijing Lv, Dalian (CN); Yong Zou, Dalian (CN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/650,497

(22) Filed: Apr. 30, 2024

(51) Int. Cl.
*G06F 16/00* (2019.01)
*G06F 16/75* (2019.01)
*G06F 16/78* (2019.01)
*G06F 16/783* (2019.01)

(52) U.S. Cl.
CPC .......... *G06F 16/75* (2019.01); *G06F 16/7844* (2019.01); *G06F 16/7867* (2019.01)

(58) Field of Classification Search
CPC ... G06F 16/75; G06F 16/7844; G06F 16/7867
See application file for complete search history.

(56) References Cited

U.S. PATENT DOCUMENTS

| | | | |
|---|---|---|---|
| 9,620,147 B2 * | 4/2017 | Deshmukh | G10L 15/26 |
| 10,949,907 B1 | 3/2021 | Jain et al. | |
| 11,087,756 B1 | 8/2021 | Presant et al. | |
| 11,244,167 B2 | 2/2022 | Zhao et al. | |
| 11,264,009 B2 | 3/2022 | Hori et al. | |
| 11,487,999 B2 | 11/2022 | Le et al. | |
| 11,615,308 B2 | 3/2023 | Zhao et al. | |
| 11,715,289 B2 | 8/2023 | Koukoumidis et al. | |
| 11,720,750 B1 | 8/2023 | Kim et al. | |

(Continued)

OTHER PUBLICATIONS

Zhao, Wayne Xin, et al. "Dense text retrieval based on pretrained language models: A survey." Nov. 2022. <https://web.archive.org/web/20221129051929/https://arxiv.org/abs/2211.14876> (Year: 2022).*

(Continued)

*Primary Examiner* — Syed H Hasan
(74) *Attorney, Agent, or Firm* — Cesari and McKenna, LLP

(57) ABSTRACT

Methods and apparatuses for multimodal enhancement of interactions in conversation service applications include a server that establishes a chat-based communication session between a conversation service application and a client computing device. Query input is captured from a user during the session. The server converts an audio segment corresponding to a video into a video transcript using speech recognition, and determines a transcript portion for the video that is responsive to the query input using a dense passage retriever model. The server selects video frames from the video that correspond to the transcript portion and determines, for the selected frames, a predicted relevancy between the selected frame and the query input. The server generates a response to the query input comprising the selected frames based upon the relevancy. The server transmits the response to the client device for display.

18 Claims, 7 Drawing Sheets

(56) References Cited

U.S. PATENT DOCUMENTS

| | | | | |
|---|---|---|---|---|
| 2002/0010916 | A1* | 1/2002 | Thong | H04N 5/278 |
| | | | | 725/1 |
| 2002/0144293 | A1* | 10/2002 | Dimitrova | G06F 16/732 |
| | | | | 725/141 |
| 2003/0163816 | A1* | 8/2003 | Gutta | H04N 21/44222 |
| | | | | 725/135 |
| 2008/0046406 | A1* | 2/2008 | Seide | G06F 16/7328 |
| 2015/0296228 | A1* | 10/2015 | Chen | H04N 21/8126 |
| | | | | 725/34 |
| 2017/0098443 | A1* | 4/2017 | Bhatt | G06F 16/35 |
| 2019/0147366 | A1* | 5/2019 | Sankaran | G06N 20/00 |
| | | | | 706/12 |
| 2019/0370412 | A1* | 12/2019 | Hammontree | G06F 16/90332 |
| 2022/0405484 | A1 | 12/2022 | Kanchibhotla et al. | |
| 2023/0154159 | A1 | 5/2023 | Kim | |
| 2023/0386208 | A1* | 11/2023 | Jin | G06F 16/7844 |

OTHER PUBLICATIONS

J. Johnson et al., "Billion-scale similarity search with GPUs," arXiv: 1702.08734v1 [cs.CV], Feb. 28, 2017, available at https://arxiv.org/pdf/1702.08734.pdf, 12 pages.

V. Karpukhin et al., "Dense Passage Retrieval for Open-Domain Question Answering," arXiv:2004.04906v3 [cs.CL], Sep. 30, 2020, available at https://arxiv.org/pdf/2004.04906.pdf, 13 pages.

J. Devlin et al., "BERT: Pre-training of Deep Bidirectional Transformers for Language Understanding," arXiv:1810.04805v2 [cs.CL], May 24, 2019, available at https://arxiv.org/pdf/1810.04805.pdf, 16 pages.

A. Dosovitskiy et al., "An Image is Worth 16×16 Words: Transformers for Image Recognition at Scale," arXiv:2010.11929v2 [cs.CV], Jun. 3, 2021, available at https://arxiv.org/pdf/2010.11929.pdf, 22 pages.

K. Song et al., "MPNet: Masked and Permuted Pre-training for Language Understanding," arXiv:2004.09297v2 [cs.CL], Nov. 2, 2020, available at https://arxiv.org/pdf/2004.09297.pdf, 14 pages.

A. Nagrani et al., "Attention Bottlenecks for Multimodal Fusion," arXiv:2107.00135v3 [cs.CV], Nov. 30, 2022, available at https://arxiv.org/pdf/2107.00135.pdf, 19 pages.

D. Gao et al., "MIST: Multi-modal Iterative Spatial-Temporal Transformer for Long-form Video Question Answering," arXiv:2212.09522v1 [cs.CV], Dec. 19, 2022, available at https://arxiv.org/pdf/2212.09522.pdf, 14 pages.

M. Peng et al., "Efficient End-to-End Video Question Answering with Pyramidal Multimodal Transformer," arXiv:2302.02136v2 [cs.CV], Mar. 5, 2023, available at https://arxiv.org/pdf/2302.02136.pdf, 9 pages.

K. Wang et al., "A Comprehensive Survey on Cross-modal Retrieval," arXiv:1607.06215v1 [cs.MM], Jul. 21, 2016, available at https://arxiv.org/pdf/1607.06215, 20 pages.

* cited by examiner

US 12,235,897 B1

MULTIMODAL ENHANCEMENT OF INTERACTIONS IN CONVERSATION SERVICE APPLICATIONS

TECHNICAL FIELD

This application relates generally to methods and apparatuses, including computer program products, for multimodal enhancement of interactions in conversation service applications.

BACKGROUND

As computing technology has become commonplace, many users have abandoned the use of live telephone conversations with service agents and representatives to answer questions and resolve issues, in favor of electronic communications such as text-based and/or speech-based conversation sessions that involve the use of computing devices and related chat-based software. In order to efficiently manage this form of communication, many organizations are turning to automated conversation service software applications (such as virtual assistants, question/answer systems, translators, and chatbots) to interact with end users intelligently using advanced language processing and data interpretation techniques. Many times, a conversation service software application can resolve the end user's inquiry altogether, thereby eliminating the need for the end user to contact a live customer service agent.

However, a drawback of such aforementioned conversation service software applications is that they are typically monomodal—meaning that the applications are only capable of receiving requests and/or providing responses comprising a single mode of information (e.g., text, images, audio, or video). As a result, these applications are limited in the type and complexity of responsive information they can provide to an end user's query. It would be beneficial to improve existing conversation service applications to provide customized, multimodal responses to end user inquiries that include both text and video.

SUMMARY

Therefore, what is needed are systems and methods for enhancing responses of conversation service application software via a multimodal approach. The techniques described herein beneficially provide a unique methodology for generating multimodal responses to user queries that quickly identifies specific portions of videos from a large universe of video content, and generates a customized video clip along with a text answer that is responsive to a user request. Instead of adopting existing approaches—such a simple chat conversation that relies on exchanging text messages between the end user and the conversation service application, or a video searching process that simply matches keywords between a user query and video content, the methods and systems described herein leverage machine learning algorithms to perform advanced relevancy determinations for both video transcripts and video frames against an input query in order to provide a customized response that is predicted to be more useful and relevant to the end user.

The invention, in one aspect, features a computer system for multimodal enhancement of interactions in conversation service applications. The system comprises a server computing device with a memory to store computer-executable instructions and a processor that executes the computer-executable instructions. The server computing device establishes a chat-based communication session between a conversation service application of the server computing device and a client computing device. The conversation service application captures query input from a user of the client computing device during the chat-based communication session. The server computing device converts, for each of a plurality of videos, an audio segment corresponding to the video into a video transcript using speech recognition. The server computing device determines a video transcript portion for one of the plurality of videos that is responsive to the query input using a dense passage retriever model. The server computing device selects one or more video frames from the video that corresponds to the responsive video transcript portion. The server computing device determines, for each of the selected video frames, a predicted relevancy between the selected video frame and the query input using a pretrained relevancy classification model. The conversation service application generates a response to the query input, the response comprising one or more of the selected video frames based upon the predictions of relevancy. The conversation service application transmits the generated response to the client computing device for display to the user during the chat-based communication session.

The invention, in another aspect, features a computerized method of multimodal enhancement of interactions in conversation service applications. A server computing device establishes a chat-based communication session between a conversation service application of the server computing device and a client computing device. The conversation service application captures query input from a user of the client computing device during the chat-based communication session. The server computing device converts, for each of a plurality of videos, an audio segment corresponding to the video into a video transcript using speech recognition. The server computing device determines a video transcript portion for one of the plurality of videos that is responsive to the query input using a dense passage retriever model. The server computing device selects one or more video frames from the video that corresponds to the responsive video transcript portion. The server computing device determines, for each of the selected video frames, a predicted relevancy between the selected video frame and the query input using a pretrained relevancy classification model. The conversation service application generates a response to the query input, the response comprising one or more of the selected video frames based upon the predictions of relevancy. The conversation service application transmits the generated response to the client computing device for display to the user during the chat-based communication session.

Any of the above aspects can include one or more of the following features. In some embodiments, the query input captured by the conversation service application comprises a text message, an input image, or both. In some embodiments, the video transcript comprises a corpus of text corresponding to spoken words in the audio segment. In some embodiments, determining a portion of the video transcript for one of the plurality of videos that is responsive to the query input comprises receiving, from the dense passage retriever model, a list of video transcript portions ranked according to similarity with the query input; and selecting a video transcript portion that has a closest similarity with the query input.

In some embodiments, selecting one or more video frames from the video that corresponds to the responsive video transcript portion comprises identifying a timestamp associated with the responsive video transcript portion; and selecting one or more video frames that are located at the identified timestamp in the video. In some embodiments, the pre-trained relevancy classification model comprises a first pre-trained vectorization model that converts the query input into a first multidimensional feature vector; a second pre-trained vectorization model that converts the selected video frame into a second multidimensional feature vector; a pre-trained transformer model that combines the first multidimensional feature vector and the second multidimensional feature vector into a classification input vector; and a relevancy classification model that generates the predicted relevancy between the selected video frame and the query input based upon the classification input vector.

In some embodiments, generating the response to the query input comprises capturing one or more of the selected video frames associated with an optimal predicted relevancy as generated by the pretrained relevancy classification model; and generating, by the conversation service application, a message comprising the captured video frames for transmission to the client computing device as a response to the query input. In some embodiments, the captured video frames are combined with a text message that is responsive to the query input. In some embodiments, the client computing device plays the selected video frames to the user upon receiving the response from the conversation service application.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
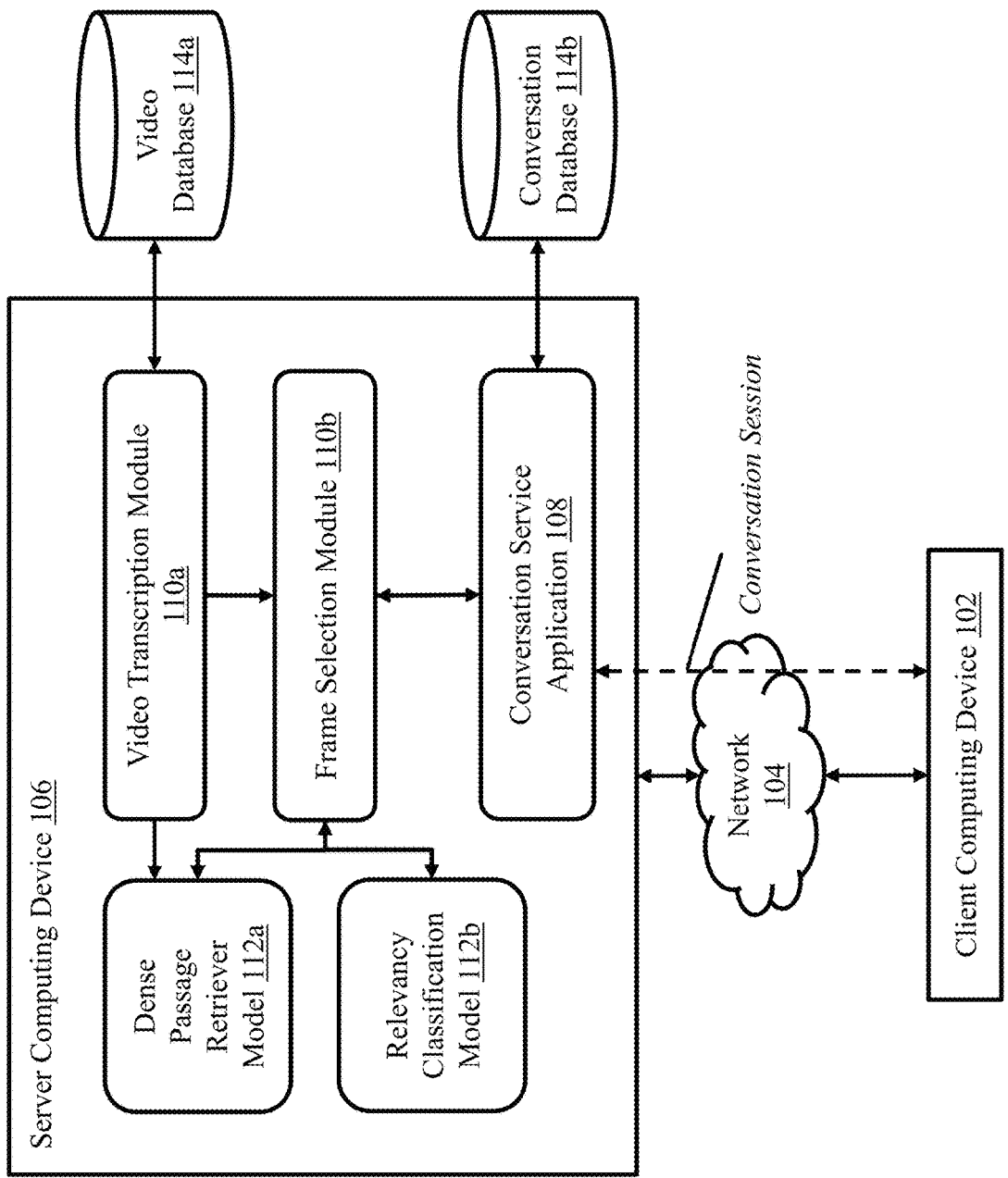
FIG. 1 is a block diagram of a system for multimodal enhancement of interactions in conversation service applications.

FIG. 1 is a block diagram of system 100 for multimodal enhancement of interactions in conversation service applications. System 100 includes client computing device 102, communications network 104, server computing device 106 that includes conversation service application 108, video transcription module 110a, frame selection module 110b, dense passage retriever model 112a, and relevancy classification model 112b, video database 114a and conversation database 114b.

Client computing device 102 connects to one or more communications networks (e.g., network 104) in order to communicate with server computing device 106 to provide input and receive output relating to one or more conversation service communication sessions as described herein. It should be appreciated that conversation service communications sessions can include, but are not limited to, text-based communications (e.g., chat messages) and/or spoken communications (e.g., voice commands). Exemplary client computing devices 102 include but are not limited to desktop computers, laptop computers, tablets, mobile devices, smartphones, smart speakers (e.g., Amazon® Echo™, Google® Home), smart appliances, Internet of Things devices, and the like. It should be appreciated that other types of computing devices that are capable of connecting to the components of the system 100 can be used without departing from the scope of invention. Although FIG. 1 depicts one client computing device 102, it should be appreciated that system 100 can include any number of client computing devices.

In some embodiments, client computing device 102 is configured with conversation service application software, which enables client computing device 102 to establish a conversation service communication session with server computing device 106 via conversation service application 108. Exemplary conversation service application software includes, but is not limited to, Amazon® Alexa™, Google® Assistant™, and Apple® Siri™.

Communication network 104 enables client computing device 102 to communicate with server computing device 106, including for the purpose of establishing and conducting conversation service communication sessions. Network 104 is typically comprised of one or more wide area networks, such as the Internet and/or a cellular network, and/or local area networks. In some embodiments, network 104 is comprised of several discrete networks and/or sub-networks (e.g., cellular to Internet).

Server computing device 106 is a device including specialized hardware and/or software modules that execute on one or more processors and interact with one or more memory modules of server computing device 106, to receive data from other components of system 100, transmit data to other components of system 100, and perform functions for multimodal enhancement of interactions in conversation service applications as described herein. Server computing device 106 includes conversation service application 108, video transcription module 110a, frame selection module 110b, dense passage retriever model 112a, and relevancy classification model 112b that execute on a processor or processors of server computing device 106. In some embodiments, elements 108, 110a, 110b, 112a, and 112b are specialized sets of computer software instructions programmed onto one or more dedicated processors in server computing device 106.

As can be appreciated, in some embodiments conversation service application 108 comprises a chat-based software application (i.e., chatbot, interactive voice response (IVR) module, virtual assistant) configured to automatically interact with a user at client computing device 102 in order to gather information and/or respond to inquiries. An exemplary conversation service application can be based upon a natural language processing (NLP) and/or natural language understanding (NLU) architecture which intelligently parses text messages and/or images received from client computing device 102 to understand the context of the user request and how to best respond to it. In some embodiments, conversation service application 108 can establish a chat-based communication session with corresponding software on client computing device 102 to establish and participate in a live conversation session with a user at client computing device 102. In these embodiments, conversation service application 108 provides a chat interface for the exchange of messages between server computing device 106 and client computing device 102.

Although elements 108, 110a, 110b, 112a, and 112b are shown in FIG. 1 as executing within a single server computing device 106, in some embodiments the functionality of elements 108, 110a, 110b, 112a, and 112b can be distributed among one or a plurality of other computing devices that are coupled to server computing device 106. As shown in FIG. 1, server computing device 106 enables elements 108, 110a, 110b, 112a, and 112b to communicate with each other in order to exchange data for the purpose of performing the described functions. It should be appreciated that any number of computing devices, arranged in a variety of architectures, resources, and configurations (e.g., distributed computing, cluster computing, virtual computing, cloud computing) can be used without departing from the scope of the invention. Exemplary functionality of elements 108, 110a, 110b, 112a, and 112b is described in greater detail throughout this specification.

Databases 114a, 114b are coupled to server computing device 106 and each database 114a, 114b is configured to receive, generate, and store specific segments of data relating to the process of automated optimization and personalization of customer-specific communication channels using feature classification as described herein. In some embodiments, all or a portion of databases 114a, 114b can be integrated with server computing device 106 or be located on a separate computing device or devices.

In some embodiments, video database 114a is configured to store digital files comprising video content. Exemplary video content files that can be stored in database 114 include, but are not limited to, MP4 (MPEG-4 Part 14), MOV (QuickTime™ Movie), WMV (Windows™ Media Viewer), and AVI (Audio Video Interleave). In some embodiments, the video content files also comprise accompanying audio content which can include spoken word audio (e.g., narration, dialogue, or other speech of a person depicted in the video content). Instead of or in addition to storing digital video content files, video database 114a can store links or pointers to externally-hosted or stored video content files. For example, video database 114a can store a URL that references a video content file or video stream that can be retrieved and ingested by video transcription module 110a as described in detail below.

In some embodiments, conversation database 114b is configured to store message transcripts associated with conversation service communication sessions between conversation service application 108 of server computing device 106 and one or more client computing devices 102. For example, database 114b stores the sequence of messages exchanged between client device 102 and application 108 during a conversation—including timestamps, identity of device that originated the message (e.g., IP address, user name, etc.), and/or other metadata associated with each message.

Figure 2:
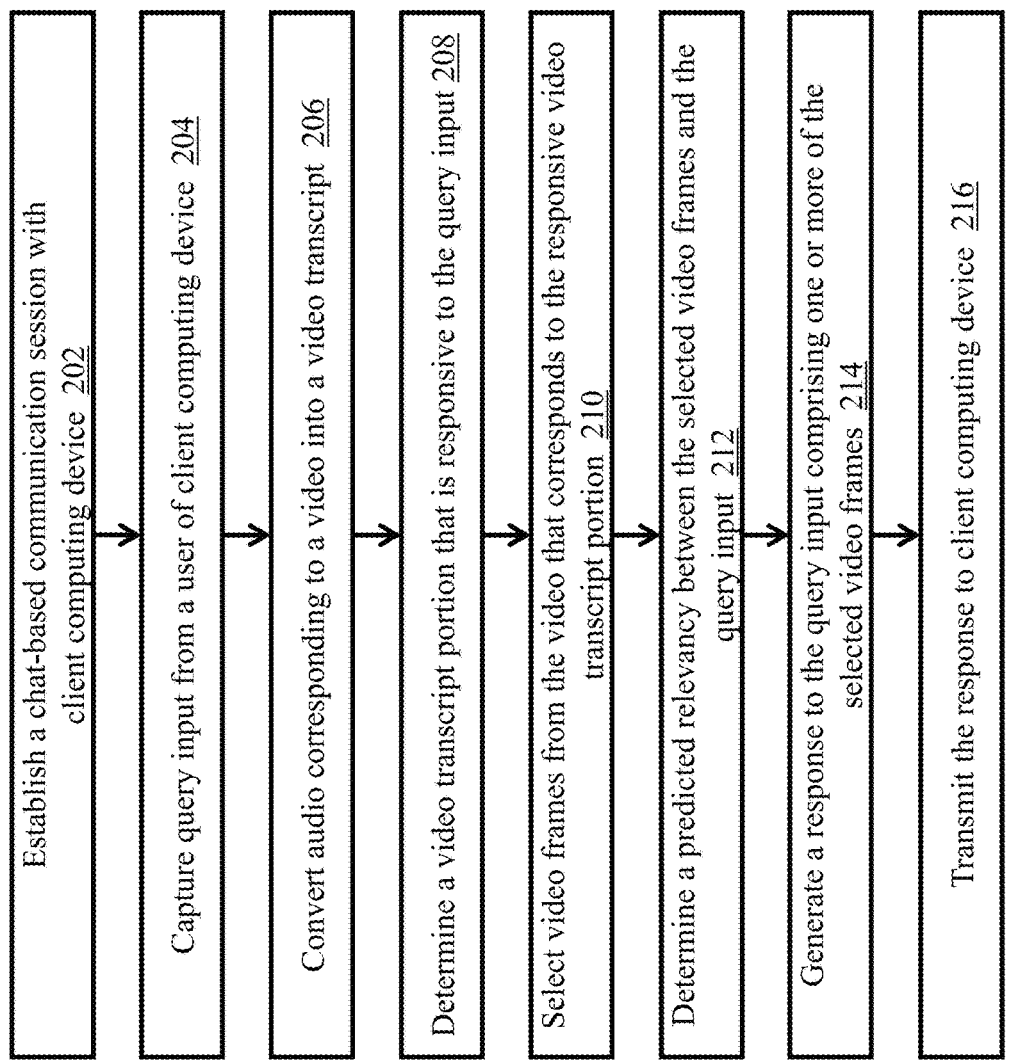
FIG. 2 is a flow diagram of a method of multimodal enhancement of interactions in conversation service applications.

FIG. 2 is a flow diagram of a method 200 of multimodal enhancement of interactions in conversation service applications, using system 100 of FIG. 1. Server computing device 106 establishes (step 202) a conversation service communication session with client computing device 102 via conversation service application 108. For example, a user at client computing device 102 can indicate that they want to interact with conversation service application 108 to retrieve information. The user may provide this indication by, e.g., launching a conversation service application on client computing device 102, typing a message into an input element in an application user interface on client computing device 102, and/or speaking a query or request into a microphone of client computing device 102. A message is transmitted from client computing device 102 to conversation service application 108 of server computing device 106, which receives and parses the message.

In some embodiments, when the session is established, server computing device 106 can transmit one or more messages to client computing device 102 that greet the user and ask the user how conversation service application 108 can help. In response, the user at client computing device 102 can submit one or more messages that relate to the purpose for initiating the conversation service communication session. Conversations service application 108 receives the message(s) from the user and creates a dialogue for the communication session between application 108 and client computing device 102. As can be appreciated, a dialogue typically corresponds to a state-based conversation flow between client computing device 102 and conversation service application 108, where application 108 can parse the incoming messages and determine appropriate responses and/or perform specific functions (e.g., information retrieval, transaction processing) as necessary. The dialogue is used by application 108 to monitor and manage the conversation flow, including recording message exchanges for the conversation session in database 114b.

Once the conversation session is established between conversation service application 108 and device 102, application 108 captures (step 204) query input from a user of client computing device 102. As mentioned previously, a user at client computing device 102 provides input (e.g., text, speech) in the form of a query that is transmitted to application 108 for analysis. For example, a user may provide the query "Will a cat eat dog food?" Client computing device 102 generates a conversation message that includes the user query and transmits the message to application 108.

Concurrently with conversation session activity performed by application 108, video transcription module 110a of server computing device 106 converts (step 206) an audio segment corresponding to a video (e.g., stored or referenced in video database 114a) into a video transcript using a speech recognition algorithm. In some embodiments, video transcription module 110a ingests video content files from database 114a and separates the audio content contained in the video file from the video content to generate an audio content file corresponding to the video. Module 110a then applies a speech recognition algorithm to the audio content file to generate a transcript comprising a corpus of text that corresponds to the audio content file (and, by association, the video content file). In some embodiments, video transcription module 110a utilizes the moviepy python package (available at pypi.org/project/moviepy and zulko.github.io/moviepy/) to extract the audio content file from the video, and module 110a uses the SpeechRecognition python package (available at pypi.org/project/SpeechRecognition and github.com/Uberi/speech_recognition) to convert the extracted audio content into a corpus of text. It should be appreciated that other types of speech recognition software, such as Google Speech-to-Text, IBM Watson Speech to Text, Amazon Transcribe, or OpenAI wisper, can be used by module 110a to perform the above-described functions. In some embodiments, video transcription module 110a can ingest video content files asynchronously from conversation service communication sessions being conducted by conversation service application 108. For example, video transcription module 110a can ingest video content as a background service that continuously (or periodically) generates text transcripts for video content stored or referenced in database 114a. In some embodiments, video transcription module 110a is configured to scan one or more video content repositories and/or online video hosting services to retrieve and ingest video content. The text transcripts generated by module 110a can be stored in video database 114a, another database coupled to server computing device 106, and/or in local memory at server computing device 106.

Upon receiving query input from client computing device 102 as described above (i.e., "Will a cat eat dog food?"), frame selection module 110b determines (step 208) a video transcript portion that is responsive to the query input using dense passage retriever (DPR) model 112a. Generally, DPR model 112a is a trained dense embedding model that uses two independent encoders (one for the video transcripts and one for the query input) to convert the transcripts and query input, respectively, into multidimensional vector representations. Then, a similarity measure is used to compare the query input vector to the video transcript vectors and identify one or more video transcript portions where the corresponding video transcript vector is closest to the query input vector. In one example, similarity is determined based upon the dot product of the vectors. As can be appreciated, transcript portions with a vector representation that is close to the query vector representation (based upon the similarity measure) are likely to be more relevant to the query input than transcript portions with a vector representation that is not close to the query vector representation. Because the number of video transcripts may be quite large, the video transcript vectors are indexed in order to achieve sufficient responsiveness and performance for real-time conversation applications. In some embodiments, the video transcript vectors are indexed using the FAISS algorithm available from Facebook Research (github.com/facebookresearch/faiss) and described in J. Johnson et al., "Billion-scale similarity search with GPUs," arXiv:1702.08734v1 [cs. CV] 28 Feb. 2017, available at arxiv.org/pdf/1702.08734.pdf, which is incorporated by reference. Once indexed, DPR model 112a quickly generates the multidimensional vector from the query input and retrieves one or more video transcript portions whose vector is closest to the query vector. Further detail regarding an exemplary implementation of DPR model 112a is described in V. Karpukhin et al., "Dense Passage Retrieval for Open-Domain Question Answering," arXiv:2004.04906v3 [cs.CL] 30 Sep. 2020, available at arxiv.org/pdf/2004.04906.pdf, which is incorporated herein by reference.

Figure 3:
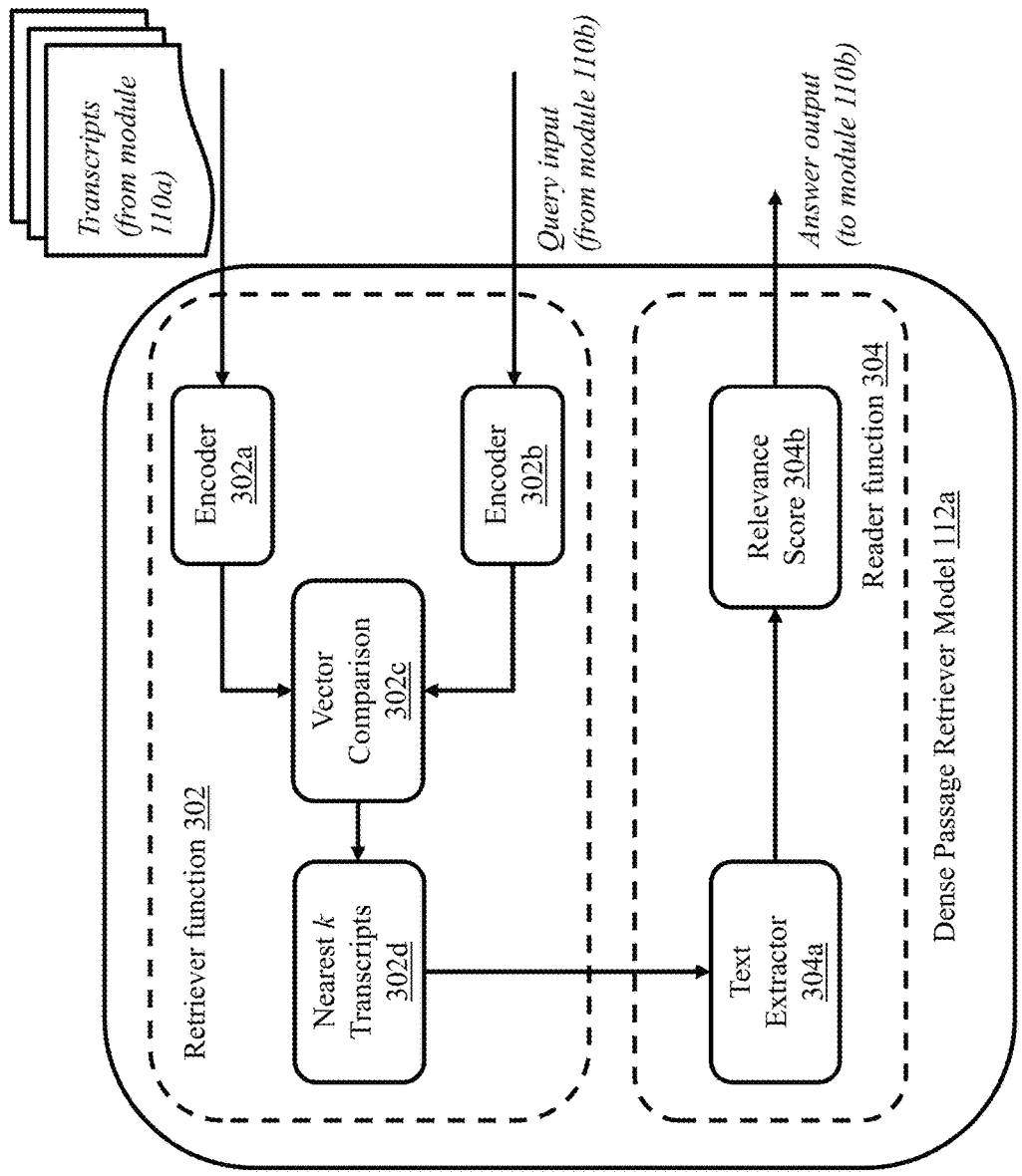
FIG. 3 is a detailed block diagram of a Dense Passage Retriever model.

FIG. 3 is a detailed block diagram of DPR model 112a. As shown in FIG. 3, DPR model 112a includes retriever function 302 and reader function 304. Encoder 302a receives video transcripts from video transcription module 110a and encodes the transcripts into multidimensional vector representations (also called embeddings). In some embodiments, the transcript encoding step occurs offline so that retriever function 302 only receives the vector representations for video transcripts (which, in some embodiments, are indexed for improved searching and retrieval as described above). Encoder 302b receives query input from frame selection module 110b and encodes the query input string into a multidimensional vector representation. Exemplary encoders 302a, 302b are based on a Bidirectional Encoder Representations from Transformers (BERT) model architecture, as described in J. Devlin et al., "BERT: Pre-training of Deep Bidirectional Transformers for Language Understanding," arXiv:1810.04805v2 [cs.CL] 24 May 2019, available at arxiv.org/pdf/1810.04805.pdf, which is incorporated herein by reference. The vector for the query input from encoder 302b is compared (function 302c) to vectors for the video transcripts using a similarity measure (e.g., cosine similarity or dot product) and the closest k transcripts are identified (function 302d) based upon the similarity measure. Retriever function 302 passes the identification of the closest k transcripts to reader function 304.

Text extractor function 304a of reader function 302 extracts one or more portion of the closest k transcripts that are likely to comprise a relevant answer to the query input. For each extracted portion, relevance score function 304b generates a score that indicates a likelihood that the extracted portion actually answers the query input—where a higher score relates to a higher likelihood. DPR model 112a returns the transcript portions and associated relevance scores to frame selection module 110b for further processing.

Turning back to FIG. 2, frame selection module 110b uses the output from DPR model 112a to select (step 210) video frames from the video content file that is associated with one of the closest k transcripts. In some embodiments, frame selection module 110b uses the transcript that has the highest relevance score as the basis for selecting video frames from the corresponding video content file. However, it should be appreciated that other methodologies for determining which of the transcript to use (e.g., random sampling) are within the scope of the technology described herein.

In some embodiments, frame selection module 110b identifies a portion of the video content file that corresponds to the closest transcript using one or more timestamps associated with the transcript and/or video content file. For example, when generating the transcript as described above, video transcription module 110a can include timestamps in the transcript that indicate the start time and/or end time of corresponding sections of the video content file. Frame selection module 110b selects and extracts a plurality of frames from the video content file that match the timestamp range from the transcript. As can be appreciated, each extracted frame is associated with a specific timestamp and the extracted frames can be sequenced consecutively according to the timestamps to comprise a video clip or snippet from the larger video content file.

Figure 4:
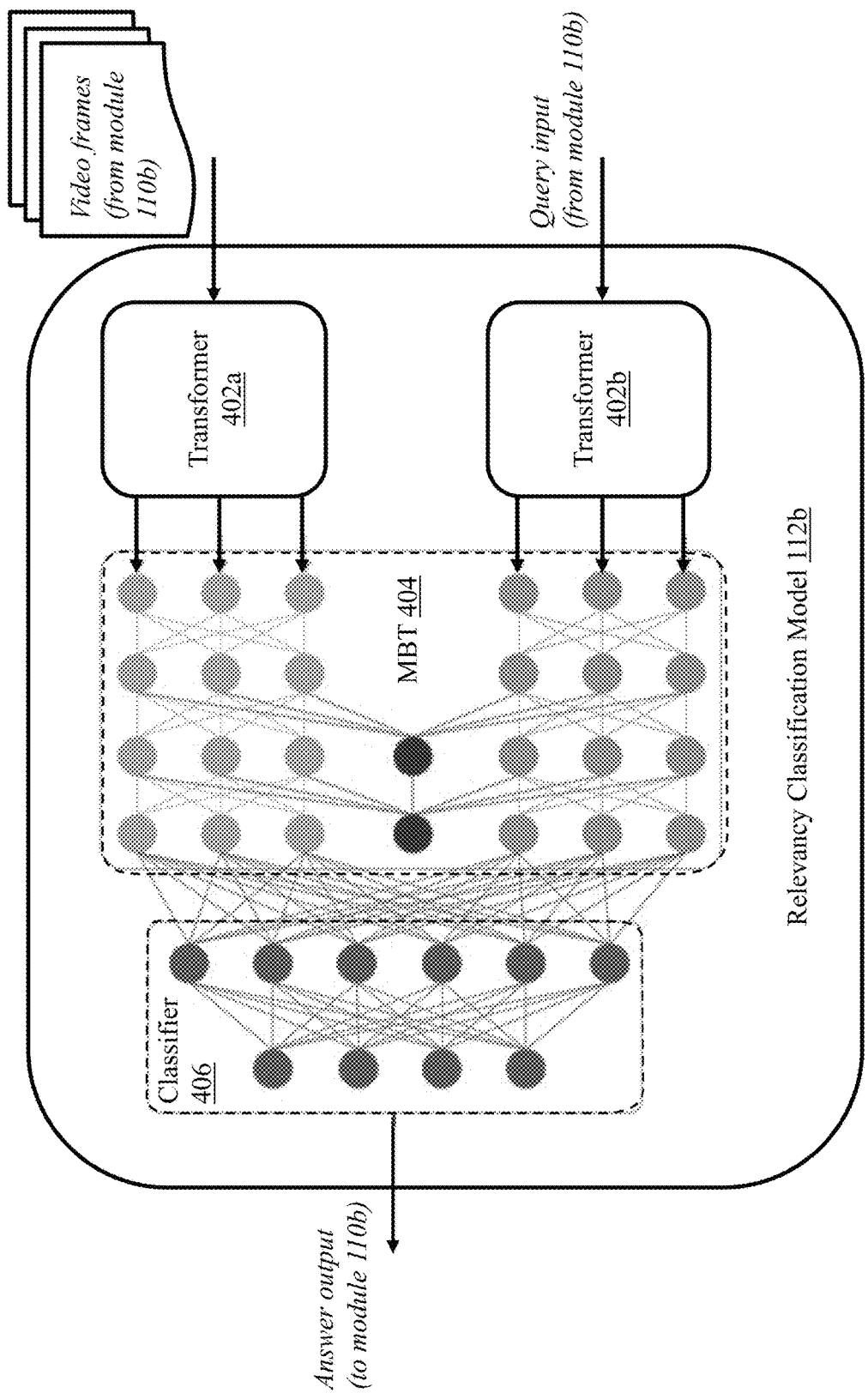
FIG. 4 is a detailed block diagram of a relevancy classification model.

After selecting the video frames, frame selection module 110b determines (step 212) a predicted relevancy between the selected video frames and the query input using relevancy classification model 112b. In some embodiments, relevancy classification model 112b is a pretrained classification model that is configured to receive as input one video frame (from the extracted video clip) and the query input, and then classify the input to generate a prediction as to how relevant the video frame is to the query input. FIG. 4 is a detailed block diagram of relevancy classification model 112b. As shown in FIG. 4, relevancy classification model 112b includes transformer 402a, transformer 404a, multimodal bottleneck transformer (MBT) 404 and classifier 406. Transformer 402a converts the image into a multidimensional vector and transformer 402b converts the query input string into another multidimensional vector, then each transformer 402a, 402b provides its respective output vector to multimodal bottleneck transformer 404 that fuses the features of the video frame vector and query input vector for subsequent relevance classification by classifier 406.

In some embodiments, transformer 402a is based upon a Vision Transformer (ViT) architecture, as described in A. Dosovitskiy et al., "An Image is Worth 16×16 Words: Transformers for Image Recognition at Scale," arXiv: 2010.11929v2 [cs.CV] 3 Jun. 2021, available at arxiv.org/pdf/2010.11929.pdf, which is incorporated herein by reference. In some embodiments, transformer 402b is based upon a masked and permuted language modeling (MPNet) architecture, as described in K. Song et al., "MPNet: Masked and Permuted Pre-training for Language Understanding," arXiv: 2004.09297v2 [cs.CL] 2 Nov. 2020, available at arxiv.org/pdf/2004.09297.pdf, which is incorporated herein by reference.

The respective output vectors from transformer 402a and 402b are fed into MBT 404. Generally, MBT 404 fuses the vectors from the different modalities (i.e., video and text) by using limited units (bottleneck 404a) to share information between the modalities at some layers, which forces the MBT 404 to collect the most relevant inputs in each modality without requiring significant additional computing cycles. Additional detail regarding the implementation of MBT 404 is described in A. Nagrani et al., "Attention Bottlenecks for Multimodal Fusion," arXiv:2107.00135v3 [cs.CV] 30 Nov. 2022, available at arxiv.org/pdf/2107.00135.pdf, which is incorporated herein by reference. The output of MBT 404 is a feature set that is fed into classifier 406 for prediction of relevancy between the input video frame and the query input. In some embodiments, classifier 406 comprises a linear classification model (e.g., logistic regression, naïve Bayes, Support Vector Machine (SVM), etc.) that classifies the input feature set with a prediction regarding how relevant the video frame is to the user's query input. For example, classifier 406 can be configured to generate a binary prediction, e.g., video frame is relevant or is not relevant. In another example, classifier 406 can be configured to generate a prediction from a range of values (e.g., between 0 and 1), where the values corresponds to a relevancy of the video frame to the query input—such as values from 0 to 0.24 indicate the frame is not relevant, values from 0.25 to 0.49 indicate the frame is not very relevant, values from 0.50 to 0.74 indicate the frame is somewhat relevant, and values from 0.75 to 1 indicate the frame is highly relevant. Classifier 406 transmits the prediction value for each frame as output to frame selection module 110b.

Using the prediction values from classifier 406, module 110b generates (step 214) a response to the query input which comprises one or more of the selected video frames. In some embodiments, module 110b determines a subset of selected frames (called key frames) that have a relevancy score that is above a defined threshold and aggregates the selected frames into a new video clip. Module 110b can sequence the aggregated frames in the new video clip according to the timestamp associated with each frame. Once the new video clip has been created, frame selection module 110b transmits (step 216) the response including the new video clip to client computing device 102 for presentation to the user during the conversation service communication session. In some embodiments, frame selection module 110b can also include the identified transcript portion from DPM model 112a in the response that is transmitted to client computing device 102—thereby providing the user with both a text response to the query input and a video response that further enhances the text response.

Figure 5:
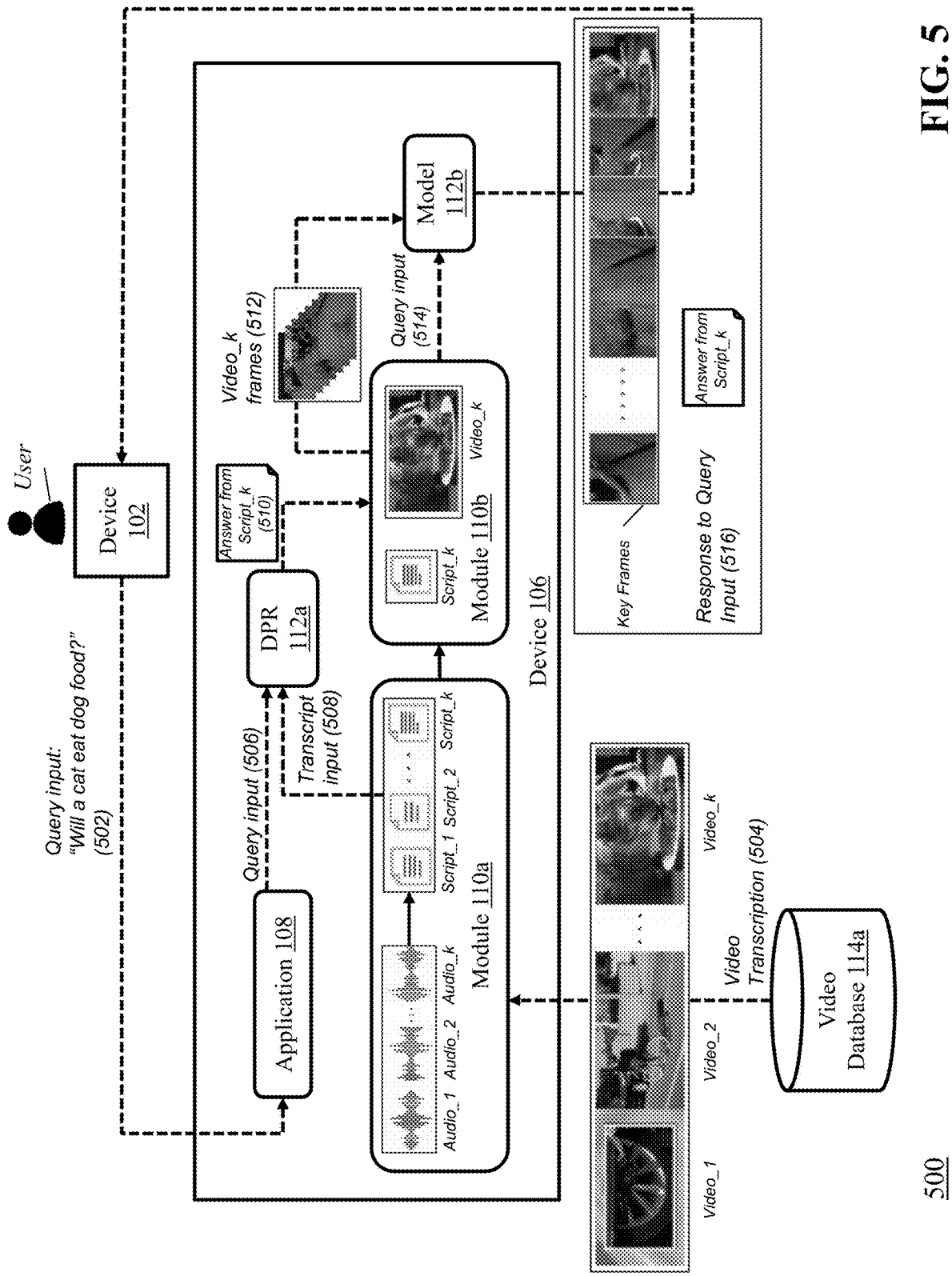
FIG. 5 is a diagram of a conversation service application workflow that provides multimodal enhancement of interactions.

As can be appreciated, the methods and systems described herein can be used to enhance existing conversation service application systems that are only able to receive query input in a single modality and/or only able to provide responsive output in a single modality. The following section describes an exemplary use case for implementation of the multimodal methods and systems described herein in an existing single-mode conversation service application. FIG. 5 is a diagram of a conversation service application workflow 500 that leverages the methods described herein to provide multimodal enhancement of interactions. A user at client computing device 102 initiates (step 502) a conversation service communication session with application 108 of server computing device and submits query input-a chat message asking, "Will cats eat dog food?"—to application 108 during the communication session.

Figure 6A:
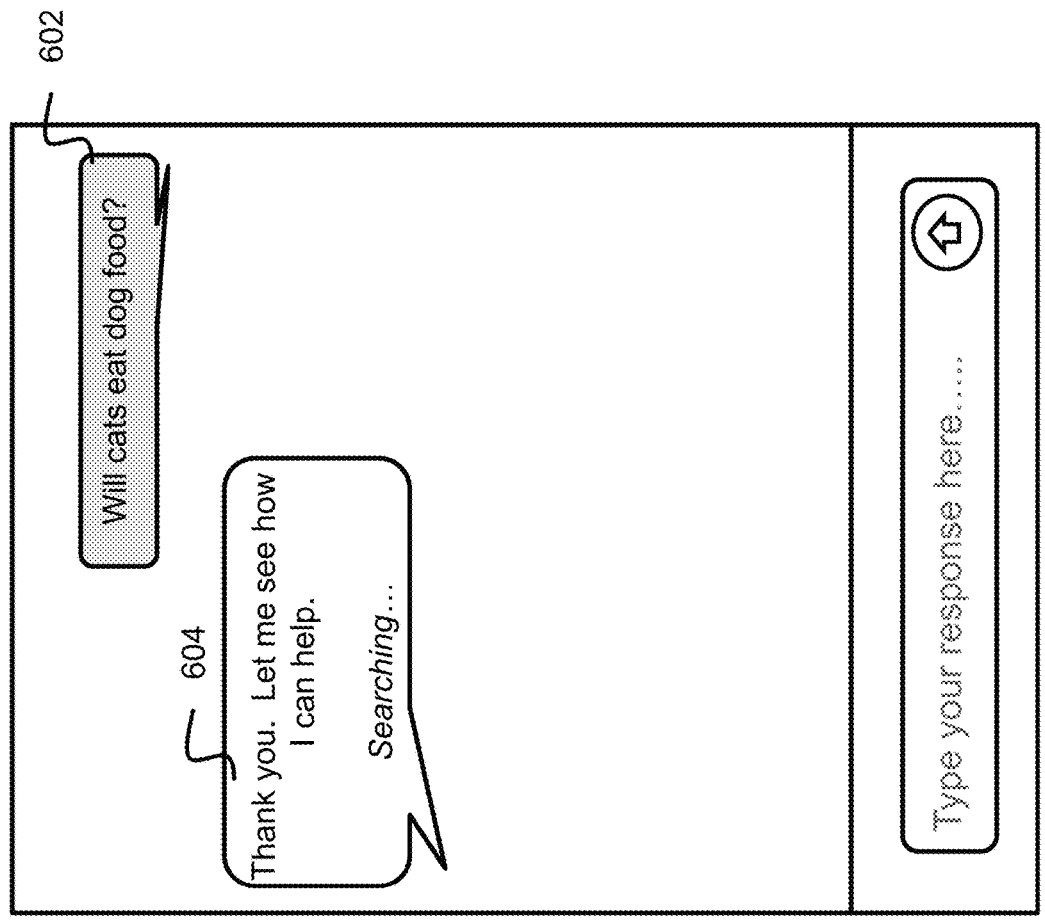
FIG. 6A is a diagram of a user interface screen from client computing device that shows query input provided by a user during a conversation service communication session.

FIG. 6A is a diagram of a user interface screen from client computing device 102 that shows the query input 602 provided by the user. The user interface screen also includes a message 604 from conversation service application 108 informing the user that application 108 is searching for a relevant response to the query.

Turning back to FIG. 5, application 108 receives query input from client computing device 102 and video transcription module 110a transcribes (step 504) a plurality of video content files (e.g., Video_1, Video_2, . . . , Video_k) stored in video database 114a. As shown, module 110a converts audio from each of the video content files into an audio content file (e.g., Audio_1, Audio_2, . . . , Audio_k) and then generates a text transcript (e.g., Script_1, Script_2, . . . . Script_k) from each of the corresponding audio content files.

Conversation service application 108 provides the query input string (step 506) to DPR model 112a, and video transcription module 110a provides the text transcript files (step 508) to DPR model 112a. As described previously, DPR model 112a identifies a video transcript (e.g., Script_k which corresponds to Video_k) that is relevant to the query input, selects a portion of the transcript that contains an answer to the query input and transmits the answer (step 510) to frame selection module 110b. Frame selection module 110b also receives Video_k and Script_k from module 110a.

Figure 6B:
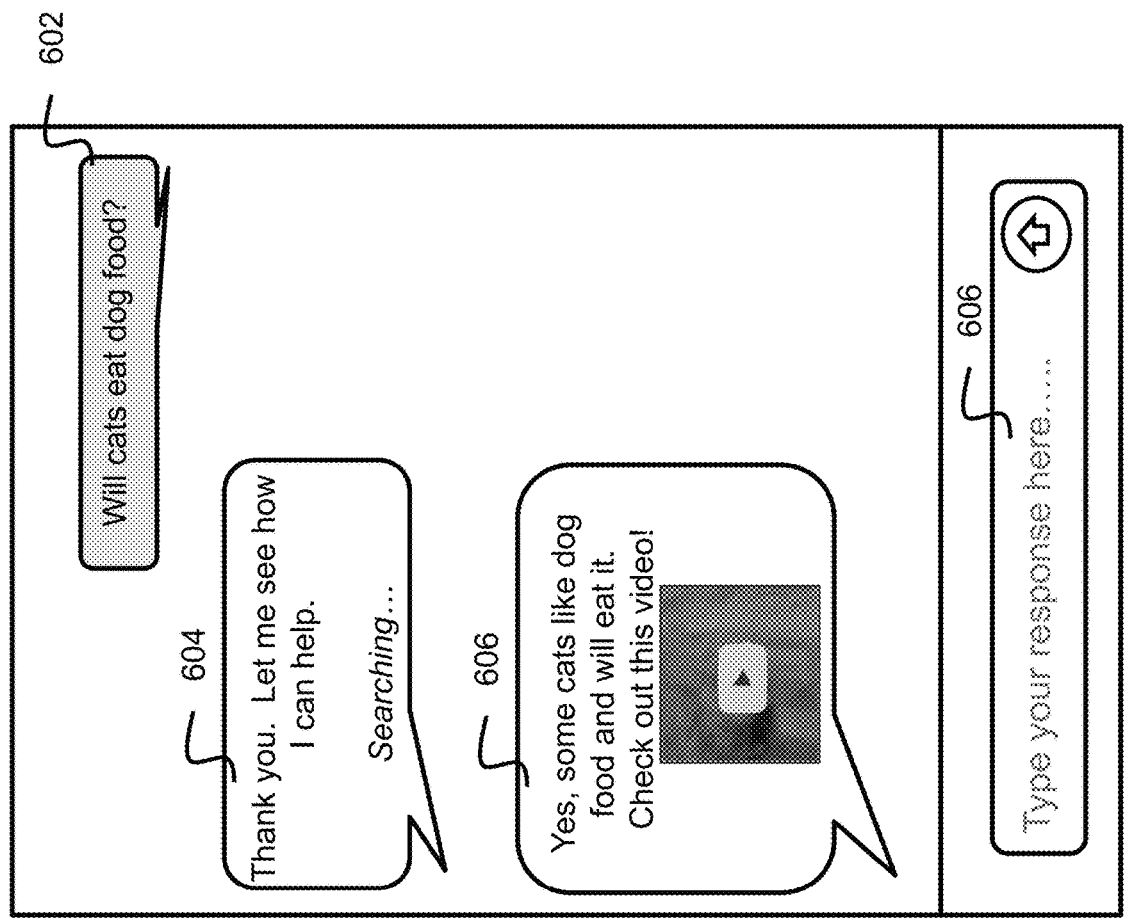
FIG. 6B is a diagram of a user interface screen from client computing device that shows a response generated by server computing device during a conversation service communication session.

Frame selection module partitions Video_k into a plurality of frames (step 512) and transmits the frames to relevancy classification model 112b. Frame selection module 110b also transmits the query input string to model 112b, which identifies one or more of the frames that are relevant to the query input as key frames. Then, model 112b transmits the answer extracted from Script_k and the frames extracted from Video_k to client computing device 102 as a response to the query input. FIG. 6B is a diagram of a user interface screen from client computing device 102 that shows the query input 602 provided by the user and the response 606 generated by server computing device 106 during a conversation service communication session. As shown in FIG. 6B, the response message 606 includes a text answer to the query input as well as a video clip comprising the key frames generated by server computing device 106.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

The computer program can be deployed in a cloud computing environment (e.g., Amazon® AWS, Microsoft® Azure, IBM® Cloud™). A cloud computing environment includes a collection of computing resources provided as a service to one or more remote computing devices that connect to the cloud computing environment via a service account—which allows access to the aforementioned computing resources. Cloud applications use various resources that are distributed within the cloud computing environment, across availability zones, and/or across multiple computing environments or data centers. Cloud applications are hosted as a service and use transitory, temporary, and/or persistent storage to store their data. These applications leverage cloud infrastructure that eliminates the need for continuous monitoring of computing infrastructure by the application developers, such as provisioning servers, clusters, virtual machines, storage devices, and/or network resources. Instead, developers use resources in the cloud computing environment to build and run the application and store relevant data.

Method steps can be performed by one or more processors executing a computer program to perform functions of the invention by operating on input data and/or generating output data. Subroutines can refer to portions of the stored computer program and/or the processor, and/or the special circuitry that implement one or more functions. Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Exemplary processors can include, but are not limited to, integrated circuit (IC) microprocessors (including single-core and multi-core processors). Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), Graphics Processing Unit (GPU) hardware (integrated and/or discrete), another type of specialized processor or processors configured to carry out the method steps, or the like.

Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices (e.g., NAND flash memory, solid state drives (SSD)); magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above-described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). The systems and methods described herein can be configured to interact with a user via wearable computing devices, such as an augmented reality (AR) appliance, a virtual reality (VR) appliance, a mixed reality (MR) appliance, or another type of device. Exemplary wearable computing devices can include, but are not limited to, headsets such as Meta™ Quest 3™ and Apple® Vision Pro™. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN),), a private IP network, an IP private branch exchange (IPBX), a wireless network (e.g., radio access network (RAN), Bluetooth™, near field communications (NFC) network, Wi-Fi™, WiMAX™, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), cellular networks, and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE), cellular (e.g., 4G, 5G), and/or other communication protocols.

Devices of the computing system can include, for example, a computer, a computer with a browser device, a telephone, an IP phone, a mobile device (e.g., cellular phone, personal digital assistant (PDA) device, smartphone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Safari™ from Apple, Inc., Microsoft® Edge® from Microsoft Corporation, and/or Mozilla® Firefox from Mozilla Corporation). Mobile computing devices include, for example, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The methods and systems described herein can utilize artificial intelligence (AI) and/or machine learning (ML) algorithms to process data and/or control computing devices. In one example, a classification model, is a trained ML algorithm that receives and analyzes input to generate corresponding output, most often a classification and/or label of the input according to a particular framework.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer system for multimodal enhancement of interactions in conversation service software applications, the system comprising a server computing device with a memory to store computer-executable instructions and a processor that executes the computer-executable instructions to:
    establish a chat-based communication session between a conversation service software application of the server computing device and a client computing device;
    capture, by the conversation service software application, query input from a user of the client computing device during the chat-based communication session;
    convert, for each of a plurality of videos, an audio segment corresponding to the video into a video transcript using speech recognition;
    determine a video transcript portion for one of the plurality of videos that is responsive to the query input using a dense passage retriever model;
    select a plurality of video frames from the video that corresponds to the responsive video transcript portion;
    determine, for each of the selected video frames, predicted relevancy between the selected video frame and the query input, comprising:
        providing the selected video frame and the query input to a pretrained relevancy classification model,
        converting the query input into a first multidimensional vector using a first transformer of the pretrained relevancy classification model,
        converting the selected video frame into a second multidimensional vector using a second transformer of the pretrained relevancy classification model,
        generating a feature set by combining features of the first multidimensional vector and features of the second multidimensional vector using a multimodal bottleneck transformer (MBT) of the pretrained relevancy classification model, and
        determining a predicted relevancy between the selected video frame and the query input by executing a classifier of the pretrained relevancy classification model on the feature set generated by the MBT;
    generate, by the conversation service software application, a response to the query input, the response comprising the selected video frames that have a predicted relevancy at or above a minimum value; and
    transmit, by the conversation service software application, the generated response to the client computing device for display to the user during the chat-based communication session.

2. The system of claim 1, wherein the query input captured by the conversation service software application comprises a text message, an input image, or both.

3. The system of claim 1, wherein the video transcript comprises a corpus of text corresponding to spoken words in the audio segment.

4. The system of claim 1, wherein determining a portion of the video transcript for one of the plurality of videos that is responsive to the query input comprises:
    receiving, from the dense passage retriever model, a list of video transcript portions ranked according to similarity with the query input; and
    selecting a video transcript portion that has a closest similarity with the query input.

5. The system of claim 1, wherein selecting one or more video frames from the video that corresponds to the responsive video transcript portion comprises:
    identifying a timestamp associated with the responsive video transcript portion; and
    selecting one or more video frames that are located at the identified timestamp in the video.

6. The system of claim 1, wherein the video frames in the generated response are combined with a text message that is responsive to the query input.

7. The system of claim 1, wherein the client computing device displays each of the video frames in the response to the user upon receiving the response from the conversation service software application.

8. The system of claim 1, wherein the first transformer is based upon a Vision Transformer (ViT) architecture and the second transformer is based upon a masked and permuted language modeling (MPNet) architecture.

9. The system of claim 1, wherein the video frames in the generated response comprise non-consecutive key frames extracted from the video and aggregated into a video clip according to a timestamp associated with each key frame.

10. A computerized method of multimodal enhancement of interactions in conversation service software applications, the method comprising:

establishing a chat-based communication session between a conversation service software application of a server computing device and a client computing device;

capturing, by the conversation service software application, query input from a user of the client computing device during the chat-based communication session;

converting, by the server computing device for each of a plurality of videos, an audio segment corresponding to the video into a video transcript using speech recognition;

determining, by the server computing device, a video transcript portion for one of the plurality of videos that is responsive to the query input using a dense passage retriever model;

selecting, by the server computing device, a plurality of video frames from the video that corresponds to the responsive video transcript portion;

determining, by the server computing device for each of the selected video frames, predicted relevancy between the selected video frame and the query input, comprising:

providing the selected video frame and the query input to a pretrained relevancy classification model, converting the query input into a first multidimensional vector using a first transformer of the pretrained relevancy classification model, converting the selected video frame into a second multidimensional vector using a second transformer of the pretrained relevancy classification model, generating a feature set by combining features of the first multidimensional vector and features of the second multidimensional vector using a multimodal bottleneck transformer (MBT) of the pretrained relevancy classification model, and determining a predicted relevancy between the selected video frame and the query input by executing a classifier of the pretrained relevancy classification model on the feature set generated by the MBT;

generating, by the conversation service software application, a response to the query input, the response comprising one or more of the selected video frames that have a predicted relevancy at or above a minimum value; and transmitting, by the conversation service software application, the generated response to the client computing device for display to the user during the chat-based communication session.

11. The method of claim 10, wherein the query input captured by the conversation service software application comprises a text message, an input image, or both.

12. The method of claim 10, wherein the video transcript comprises a corpus of text corresponding to spoken words in the audio segment.

13. The method of claim 10, wherein determining a portion of the video transcript for one of the plurality of videos that is responsive to the query input comprises:

receiving, from the dense passage retriever model, a list of video transcript portions ranked according to similarity with the query input; and selecting a video transcript portion that has a closest similarity with the query input.

14. The method of claim 10, wherein selecting one or more video frames from the video that corresponds to the responsive video transcript portion comprises:

identifying a timestamp associated with the responsive video transcript portion; and selecting one or more video frames that are located at the identified timestamp in the video.

15. The method of claim 10, wherein the video frames in the generated response are combined with a text message that is responsive to the query input.

16. The method of claim 10, wherein the client computing device displays each of the video frames in the response to the user upon receiving the response from the conversation service software application.

17. The method of claim 10, wherein the first transformer is based upon a Vision Transformer (ViT) architecture and the second transformer is based upon a masked and permuted language modeling (MPNet) architecture.

18. The method of claim 10, wherein the video frames in the generated response comprise non-consecutive key frames extracted from the video and aggregated into a video clip according to a timestamp associated with each key frame.

* * * * *